Feb. 20, 1923.
W. F. HUTTON, JR
1,446,045
TRACTOR CONTROLLING DEVICE
Filed Sept. 15, 1920
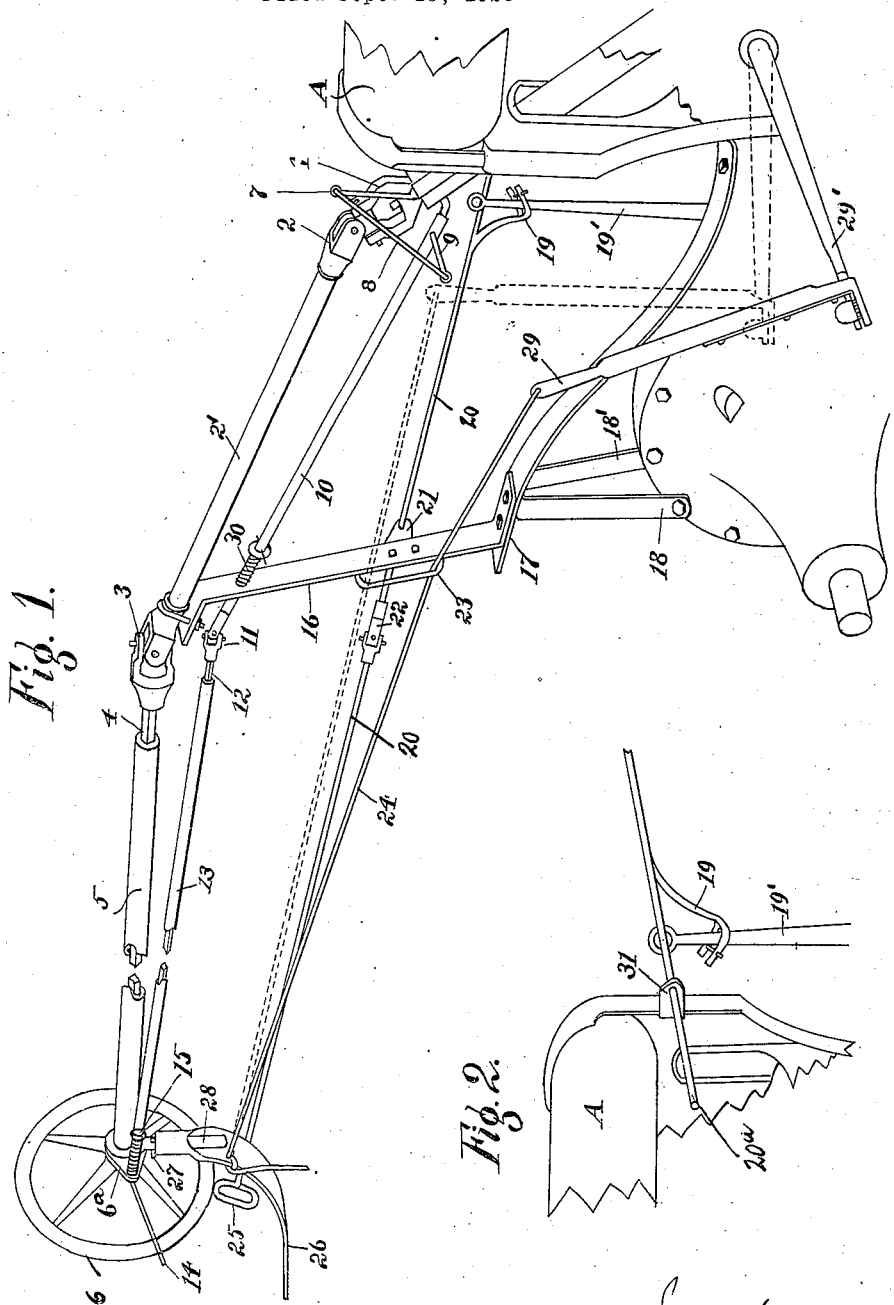
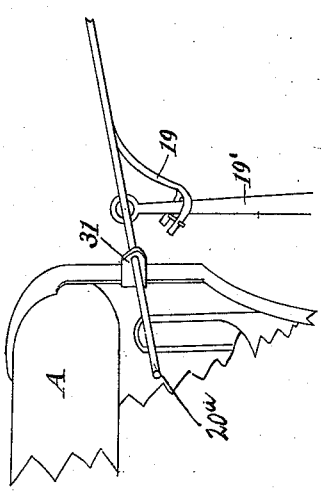
Inventor:
William F. Hutton Jr.,
by Franks Anneuman
Atty.

Patented Feb. 20, 1923.

1,446,045

UNITED STATES PATENT OFFICE.

WILLIAM F. HUTTON, JR., OF CHEROKEE, IOWA.

TRACTOR-CONTROLLING DEVICE.

Application filed September 15, 1920. Serial No. 410,550.

*To all whom it may concern:*

Be it known that I, WILLIAM F. HUTTON, Jr., a citizen of the United States of America, and resident of Cherokee, in the county of Cherokee and State of Iowa, have invented certain new and useful Improvements in Tractor-Controlling Devices, of which the following is a specification.

This invention relates to tractor controlling devices and particularly to attachments intended to be extended from the ordinary tractor to a trailer for the purpose of enabling an operator to control the steering mechanism as well as the throttle, transmission and clutch from the trailer to speedily control the movement of the tractor from the distant point.

An object of this invention is to provide mechanism capable of ready application and attachment to tractors now in common use, well known parts of such tractors being employed as supports for the bearings, brackets, and guides of the controlling rods, shafts and the like.

A further object of this invention is to produce an extensible steering mechanism and fuel controlling device having a support between the ends for stablizing and holding the tractor relatively rigid and to provide means for compensating for vibration between the tractor and the trailer.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a perspective view of a fragment of a tractor with the controlling mechanism embodying the invention applied thereto; and Figure 2 illustrates a reverse view of one end of the tractor showing the transmission control.

In these drawings A denotes a tractor which is conventionally shown, the same having a yoke 1 leading to the steering post, the said yoke having a universal joint 2 connected to a shaft 2'. A universal joint 3 connects the end of the shaft 2' with the shaft 4, the said shaft 4 being slidable in a sleeve 5 so that the shaft may be made extensible to increase or diminish the distance in which it may be operated from the tractor. An ordinary hand wheel 6 is connected to the shaft 5 and hence the steering mechanism is under the control of the elements just referred to.

The ordinary throttle lever 7 for controlling the carbureter or intake manifold is controlled by the link 8 pivotally connected to it, the said link being also pivotally connected to an arm 9 which is oscillated under the influence of the rotation of the shaft 10, the said shaft having a universal joint 11 which is connected to a telescopically mounted shaft 12 slidable in the sleeve 13. The shaft terminates in an angularly extending handle 14 which may be manipulated for controlling the fuel. A spring 15 is interposed between the bracket $6^a$ and a shoulder of the telescopic section 13 and is intended to hold the lever or handle in engagement with the bracket $6^a$.

A standard 16 has an aperture through which the shaft 10 extends and the said standard is secured to the seat frame 17 which is ordinarily supplied on tractors, the said seat frame including the standards 18 and 18' which support the member 17, the said standards 18 and 18' being anchored or supported from the gear casing.

The transmission shifting lever 19' is embraced by a yoke 19 formed on an arm which is integral with a shaft 20. A guiding bracket 21 is secured to the standard 16 and has an aperture in which the shaft 20 is supported and rotated. The shaft 20 also has movement longitudinally for the purpose of communicating oscillatory motion to the shifting lever and provision is made for not only partially rotating the shaft 20 but for thrusting it rearwardly and forwardly so that the transmission lever may be caused to "cross over" for effecting a change into the different gears. The shaft 20 has a universal joint 22 and it terminates in a handle 25, the outer end of the said shaft 20 being rotatable in a bracket 26 which is intended to be connected to a seat support of a trailer. The bracket 26 acts as a support for the pintle 28, which pintle has the shaft 5 mounted in it.

The bracket 16 has a guide 23 extending from it, in which a flexible member 24 is slidable, the said flexible member being connected to an arm 29 which is rigidly attached to the pedal 29' of the clutch so that by operating the arm 29, the clutch may be released for the purpose of shifting the gear and all of the operating parts for these elements terminate at the bracket 26, the flexible connection 24 being attached to the said bracket as fully shown in Figure 1.

The tractor has a bracket 31 secured on it, said bracket having an aperture in which an extension 20ᵃ of the shaft 20 is guided and rotated, so that the inner end of this shaft is supported and the relation is such that power may be exerted on the shifting lever transversely and longitudinally of the said shaft 20.

I claim—

1. In a tractor controlling device, a steering shaft, an extensible shaft connected to the steering shaft from a trailer, a sectional throttle controlling shaft, connections between the said shaft and a throttle controlling lever, a shaft having a yoke embracing a shifting lever, means for mounting the said shaft for rotation and movement longitudinally of its axis, a clutch releasing means, a standard supported from the tractor, and means on the standard for guiding the tractor controlling elements.

2. In a tractor controlling device, a steering shaft, an extensible shaft connected to the steering shaft from a trailer, a sectional throttle controlling shaft, connections between the said shaft and a throttle controlling lever, a shaft having a yoke embracing a shifting lever, means for mounting the said shaft for rotation and movement longitudinally of its axis, a clutch releasing means, a standard having a guiding loop, an apertured bracket extending from the said standard, the said standard having an aperture in which one of the shafts is rotatably mounted, and means at the top of the standard for anchoring the steering shaft thereto.

WILLIAM F. HUTTON, Jr.